United States Patent [19]

Hotomi

[11] Patent Number: 4,943,818
[45] Date of Patent: Jul. 24, 1990

[54] INK JET PRINTER

[75] Inventor: Hideo Hotomi, Osaka, Japan

[73] Assignee: Minolta Camera Kabushiki Kaisha, Osaka, Japan

[21] Appl. No.: 307,747

[22] Filed: Feb. 7, 1989

[30] Foreign Application Priority Data

Feb. 9, 1988 [JP] Japan .................. 63-28149

[51] Int. Cl.$^5$ ............ B41J 2/06; B41J 2/175
[52] U.S. Cl. ................................ 346/140 R
[58] Field of Search ............ 346/140, 1.1, 75

[56] References Cited

U.S. PATENT DOCUMENTS

| | | | |
|---|---|---|---|
| 4,550,324 | 10/1985 | Tamaru | 346/140 X |
| 4,647,949 | 3/1987 | Sapitowicz | 346/140 |
| 4,751,533 | 6/1988 | Saito | 346/140 |
| 4,782,347 | 11/1988 | Kurematsu | 346/140 X |

FOREIGN PATENT DOCUMENTS 54-13340 1/1979 Japan .
61-137168 6/1986 Japan .

Primary Examiner—Joseph W. Hartary
Attorney, Agent, or Firm—Burns, Doane, Swecker & Mathis

[57] ABSTRACT

An ink jet printer using thermally fusible ink. This printer comprises an ink nozzle defining a feed passage for feeding the thermally fusible ink and an orifice for ejecting the ink, a heater for heating and fusing the ink, an ink feed roller for forcibly feeding fused ink to the orifice, electrodes for ejecting the fused ink from the orifice, and drivers for operating the electrodes in accordance with an image signal. For optimal control of fused ink flows, the feed roller defines grooves on a surface thereof, or defines ink-affined and ink-repellent surface parts arranged appropriately.

34 Claims, 5 Drawing Sheets

FIG.2
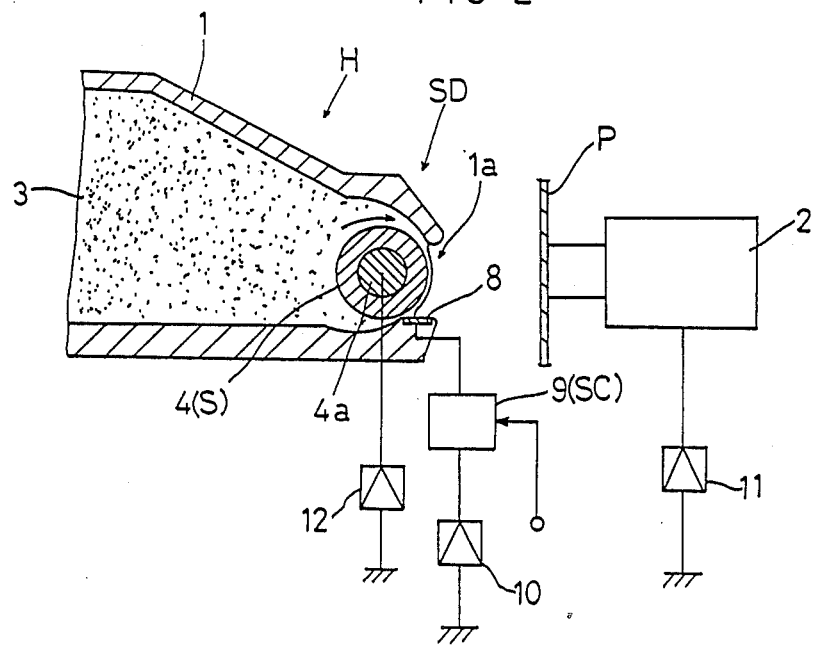
FIG.3
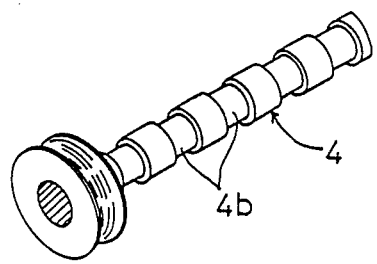
FIG.4
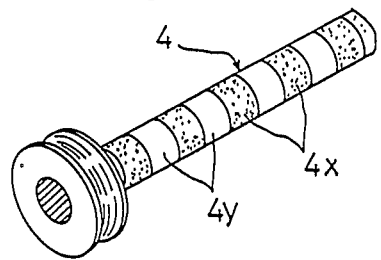
FIG.5
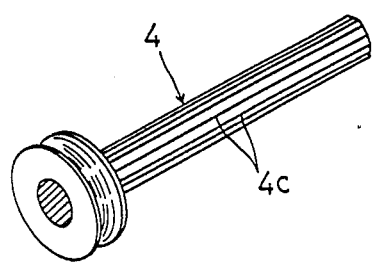
FIG.6

INK JET PRINTER

BACKGROUND OF THE INVENTION

The present invention relates to ink jet printers using thermally fusible ink. One such ink jet printer comprises an ink nozzle defining a feed passage for feeding the thermally fusible ink and an orifice for ejecting the ink, heating means for heating and fusing the ink, ejection drive means for ejecting the fused ink from the orifice, and ejection control means for operating the ejection drive means in accordance with an image signal.

This printer is capable of using high density ink to realize prints of excellent tone quality since the ink acting as an image recording medium is heated and fused for ejection. Color toners and various types of ink intended for use in electrophotographic copying machines and various printers of the thermal sublimation type may also be used in this type of ink jet printer.

One example of such ink jet printers is disclosed in Japanese Patent Publication Kokai No. 61 137168. This printer comprises a holder with a nozzle orifice for holding solid conductive ink (carbon ink), and an electrode disposed between the holder and recording paper. A high voltage is applied to the electrode and the solid conductive ink to generate sparks therebetween (arc discharge), thereby to fuse a leading part of the ink and to eject the fused ink from the orifice to the recording paper.

Such an ink jet printer, however, has the following disadvantages:

The ejection drive means for applying a high, spark producing voltage to the electrode and the solid conductive ink to impart a drive for ejecting the fused ink from the orifice, acts also as heating means for fusing a leading part of the solid conductive ink. The drive and heating means having the two functions contributes toward a simplified construction. However, the fusion of the solid conductive ink relies on the energy imparted by the sparks, and the amount of energy is variable under the influences of ambient electric fields, electric capacity of recording paper, surrounding atmosphere (temperature and humidity) and so forth. As a result, there occur variations in the amount of ink fused and ejected by one spark, which tend to deteriorate the quality of recorded images. Because of this fact and the very high drive voltage required to generate sparks for fusing and ejecting the solid conductive ink, it has been difficult to achieve high speed recording by employing line printing.

This printer has the further disadvantage that the range of usable ink is limited to conductive ink. There has been a poor prospect for this type of printer being adapted for color printing since the commercial availability of conductive color ink is limited.

SUMMARY OF THE INVENTION

The object of the present invention is to provide an ink jet printer, which is an improvement upon the known ink jet printer, which is capable of recording images of excellent tone quality suppressing variations in the amount of ink ejection, and which is readily adaptable for color printing and suited for high speed recording.

The above object is fulfilled, according to the present invention, by an ink jet printer comprising heating means for heating and fusing thermally fusible ink, and ink feed means in form of rotary means disposed adjacent an orifice for forcibly feeding fused ink to the orifice.

The feature that, for use, the thermally fusible ink is fused by the heating means enables high density ink to be used to realize excellent tone quality. Although this type of high density ink has a high viscosity when fused, the rotary type ink feed means forcibly feeds the fused ink to the orifice. Consequently, even when the ejection drive means is operated at high speed, a necessary amount of fused ink is forcibly and reliably fed to the orifice, to assure high responsivity of a recording operation.

The use of high density ink enables printing to be made with high tone quality The fact that solid, block cake, pasty and highly viscous, or powdery ink may be used means versatility of the printer with respect to the ink including toners intended for electrophotography and others. Regardless of the type of ink used, the printer has improved responsivity of a recording operation and substantially uniformalizes the diameters of dots that constitute pixels in a recorded image, whereby a high quality image is obtained at high speed.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 2 is a schematic view of a principal portion of the ink jet printer, FIGS. 3, 4, 5, and 6 are perspective view of modified rollers, respectively.

DETAILED DESCRIPTION OF THE PREFERRED EMBODIMENTS

An embodiment of the present invention will be described hereinafter with reference to the drawings.

Figure 1:
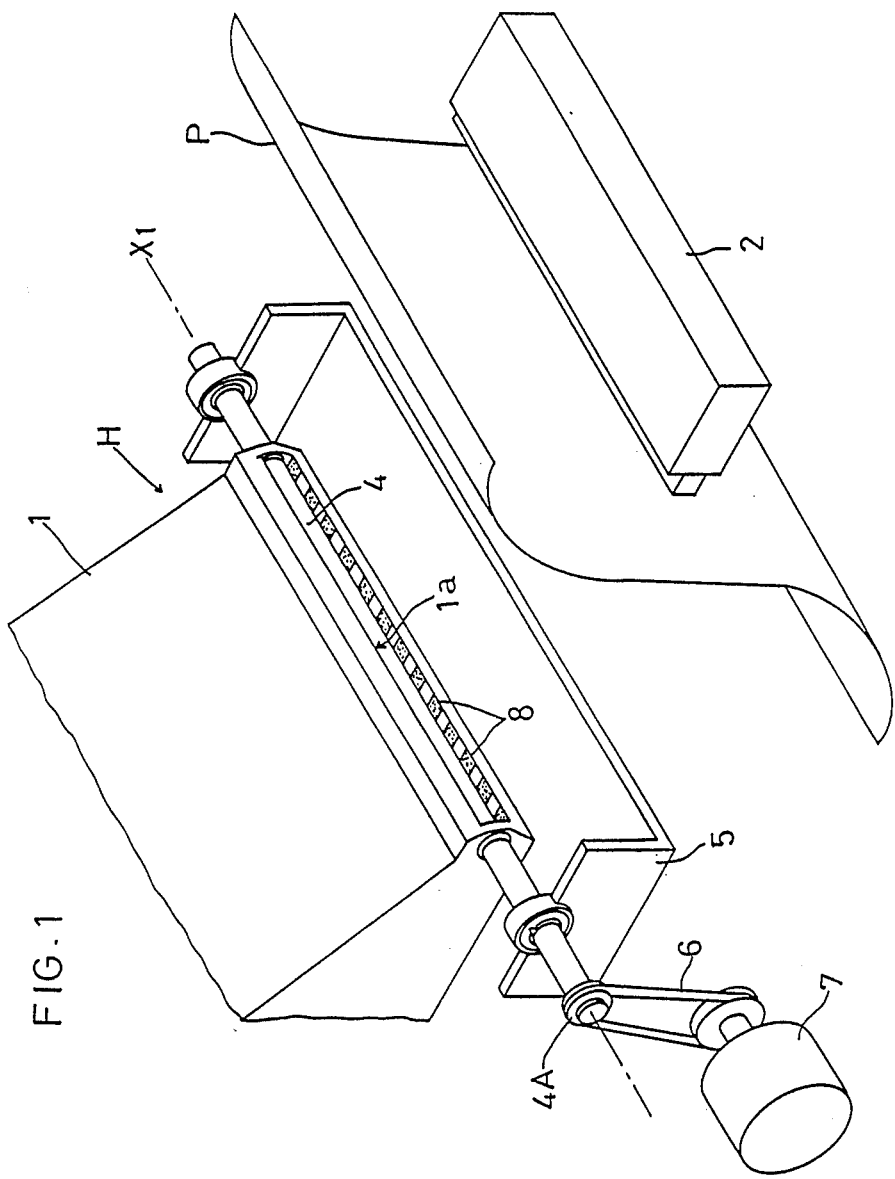
FIG. 1 is a perspective view of a recording head of an ink jet printer embodying the present invention.

As shown in FIGS. 1 and 2, an ink jet printer comprises a recording head H including an ink nozzle 1 and an electrode 2 opposed to the ink nozzle 1 across recording paper P. The ink nozzle 1 defines a slit orifice 1a, and the opposed electrode 2 extends substantially parallel to the orifice 1a.

The ink nozzle 1 is filled with thermally fusible ink 3 acting as a recording medium. The ink nozzle 1 houses a roller 4 disposed adjacent the orifice 1a such that the roller 4 almost closes the orifice 1a. This roller 4 is supported by a nozzle mount 5 for rotation about an axis Xl extending longitudinally of the orifice 1a. The roller 4 contains a heater 4a for heating and fusing the thermally fusible ink 3. The roller 4 is in a form resembling a piano wire having a very small diameter, and carries a pulley 4A fixed to one end thereof and operatively connected through a belt 6 to a drive motor 7. The drive motor 7 rotates the roller 4 at a constant rate, with the heater 4a operated, to fuse a fixed amount of ink 3 and forcibly feed the fused ink to the orifice 1a.

The ink nozzle 1 further includes a plurality of electrodes 8 embedded at fixed intervals along a lower inside wall thereof defining the orifice 1a. The electrodes 8 act to electrically charge the fused ink. Each of the electrodes 8 is connected to a power source 10 through a driver 9 to which an image signal is input for each dot to be recorded.

In recording an image, a pulse signal corresponding to the image signal is applied sequentially to these electrodes 8 for applying selected electric charges to the fused ink. Simultaneously, a pulse signal of opposite polarity is applied to the opposed electrode 2 for producing Coulomb force between the electrodes 8 and the opposed electrode 2. As a result, the fused in is drawn in jet columns from the orifice 1a to adhere to the recording paper P, whereby an image is recorded dot by dot on the recording paper P at intervals corresponding to those at which the plurality of electrodes 8 are arranged.

Thus, the plurality of electrodes 8 provided in the ink nozzle 1, the power source 10 associated with the electrodes 8, the opposed electrode 2 and a power source 11 associated with the opposed electrode 2 constitute an ejection drive means SD for ejecting the fused ink from the orifice 1a. The drivers 9 associated with the respective electrodes 8 constitute an ejection control means SC for oPerating the ejection drive means SD in accordance with the image signals.

As described above, this recording head H is constructed to produce Coulomb force between the plurality of electrodes 8 and the opposed electrode 2 through voltage application thereto, thereby to draw the fused ink and cause its ejection from the orifice 1a. It is therefore possible to continuously (or in analog mode) vary the amount of fused ink ejected from the orifice 1a by controlling the voltage application to the electrodes 8 and 2 to suitably vary strength of the electric field between the electrodes 8 and 2. This enables the recorded dot tone to be controlled by the area toning method. Consequently, this feature, in combination with availability of the high density, thermally fusible ink suitable for excellent tone expression, realizes a very high degree of tone quality.

Furthermore, this recording head H has the orifice 1a defined in slit form instead of being divided for each dot. This construction requires no fine shaping to define divisions, and facilitates high density of recorded dots longitudinally of the orifice 1a. The linearly extending orifice 1a is substantially free from clogging by the fused ink. Thus, high density recording is made possible with advantages in respect of recording head manufacture and maintenance.

The thermally fusible ink 3, specifically, comprises a powdery material resembling a toner used as a recording medium for electrophotographic copying machines and printers. This thermally fusible ink has a fusing temperature of 60–160° C., preferably 60–100° C. If the fusing temperature is below 60° C., there will occur unsatisfactory ink fixation and the image recorded on the recording paper will have poor environmental stability. f the fusing temperature exceeds 160° C., an excessive quantity of calorie will be required for fusing the ink, which necessitates a large and expensive device. The thermally fusible ink, when fused, has a viscosity of 0.8–500 c.p., preferably 0.9–260. If the viscosity is below 0.8 c.p., there will occur difficulties for feed means to feed the ink. If the viscosity exceeds 500 c.p., there will occur difficulties for the ink to penetrate into narrow parts, which impair satisfactory ink feed to the orifice.

As described, the thermally fusible ink 3 is fused only in a necessary amount by the heater 4a for use in recording. This prevents the ink from being heated over a long time, thereby to minimize deterioration of ink quality. The fused ink adheres, by virtue of surface tension, to the periphery of the roller 4 acting as feed means. With the constant rate rotation of the roller 4, the fused ink adhering thereto is forcibly fed to the orifice 1a. Then the ejection drive means SD causes the ink to be ejected from the orifice 1a in a substantially constant amount at all times, thereby forming dots of uniform diameter on the recording paper P to produce a high quality image. The reliable feeding of the fused ink realizes high speed recording too. Reference numeral 12 in FIG. 2 denotes a power source for operating the heater 4a.

The roller 4 is disposed so as to plug the entire area of orifice 1a and, as a result of rotation of the roller 4, the fused ink adhering to the surface of roller 4 is fed to the orifice 1a through a gap between the surface of roller 4 and an inside wall defining the orifice 1a. This construction reduces the possibility of the fused ink contacting ambient air, and causes the rotation of roller 4 to agitate the fused ink in the ink nozzle 1. Consequently, although high density ink may be used as noted hereinbefore, the fused ink is prevented from hardening inside the ink nozzle 1 so that the fused ink may be ejected with hardly any trouble over a long time.

Other embodiments of the present invention are listed hereunder.

(1) In the described embodiment, the opposed electrode 2 is uniformly charged throughout by the power source 11. This construction may be replaced by a construction known as the multi-stylus type in which a plurality of electrodes are opposed to the plurality of electrodes 8 arranged in the orifice 1a, respectively.

(2) In the described embodiment, the ejection drive means SD ejects the fused ink by means of voltage apPlication between the electrodes 8 and 2 opposed to one another across the recording paper P. This construction may be modified in various ways. For example, the fused ink may be ejected by voltage application to a pair of electrodes provided in the orifice 1a.

(3) The roller 4 acting as feed means S has a smooth peripheral surface in the described embodiment. This roller may be modified as noted below. Incidentally, the roller 4 in the described embodiment and in the following modifications may be rotated clockwise or counterclockwise.

(3-1) In one modification as shown in FIG. 3, the roller 4 defines peripheral grooves 4b arranged at fixed intervals corresponding to the intervals at which the plurality of electrodes 8 are arranged along the orifice 1a. According to this construction, opposite peripheral surfaces of the roller 4 across each groove 4b contact the inside walls of the orifice 1a, which is effective for stopping sideways flows of the fused ink thereby to prevent deterioration in image quality. Further, the dot diameter is variable, when desired, by varying the width and depth of the grooves 4b.

(3-2) As shown in FIG. 4, the roller 4 may be surfacially treated into ink affined parts 4x and ink-repellent parts 4y arranged alternately at fixed intervals corresponding to the intervals at which the plurality of electrodes 8 are arranged along the orifice 1a. This also is effective for preventing sideways flows of the fused ink which would deteriorate image quality.

(3-3) as shown in FIG. 5, the roller 4 defines a plurality of axial grooves 4c extending on its surface longitudinally of the orifice 1a. According to this construction, opposite surfaces of the roller 4 across each groove 4c contact the inside walls of the orifice 1a, which produces an additional effect of preventing hardening of the fused-ink, thereby allowing a still thicker ink to be used.

(3-4) As shown in FIG. 6, the roller 4 may be formed of a stranded wire.

Figure 7:
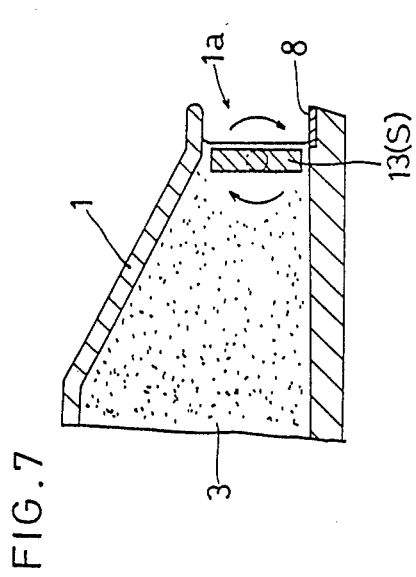

(4) As shown in FIG. 7, the feed means S may comprise, instead of the roller 4, a plate 13 rotatable about an axis extending longitudinally of the orifice 1a. This plate 13 has an axial width substantially corresponding to a width of the orifice 1a. Various other modifications are possible as to the shape and material of the feed means S and the drive structure for feeding the fused ink to the orifice.

Figure 8:
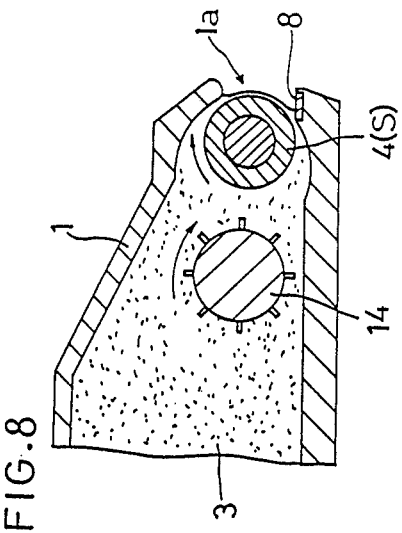
FIGS. 8, 9A, 9B and 10 are sectional side views of modified ink nozzles, respectively.
Figure 11:
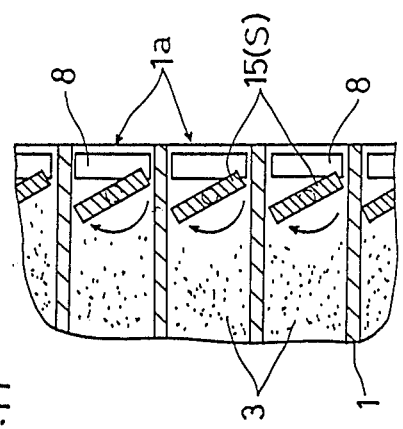
FIG. 11 is a sectional plan view of a modified ink nozzle.

(5) As shown in FIG. 8, a roller 14 specially for agitating the fused ink in the ink nozzle 1 may be provided in addition to the roller 4 acting as the feed means S. This construction prevents ink coagulation at the boundary of the thermally fusible ink being heated and fused into liquid, thereby to promote smooth delivery of the fused ink.

Figure 10:
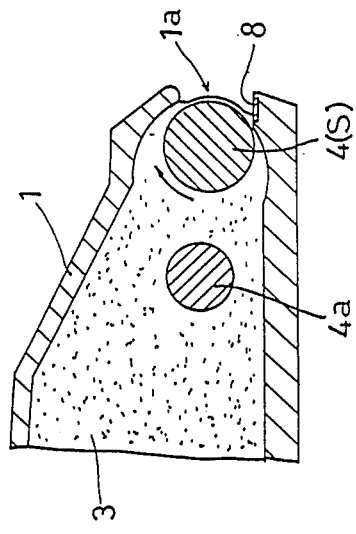

(6) The heater 4a is contained in the roller 4 acting as the feed means S in the foregoing embodiment, but the heating means may be provided separately from the roller 4. For example, heaters 4a may be disposed in the inside walls of the ink nozzle 1 as shown in FIG. 9A. As shown in FIG. 10, a heater 4a may be disposed in an ink feeding passage to effect a uniform and efficient heat energy transfer for fusing the thermally fusible ink. Though not shown, the entire ink nozzle 1 may act as a heater.

Figure 9B:
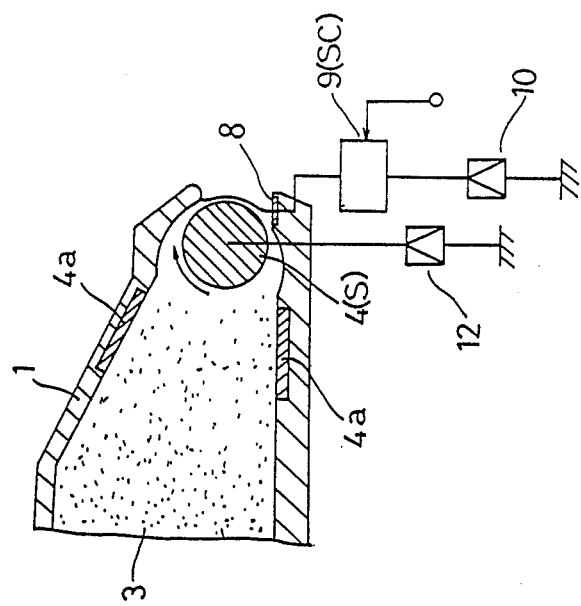
Figure 9A:
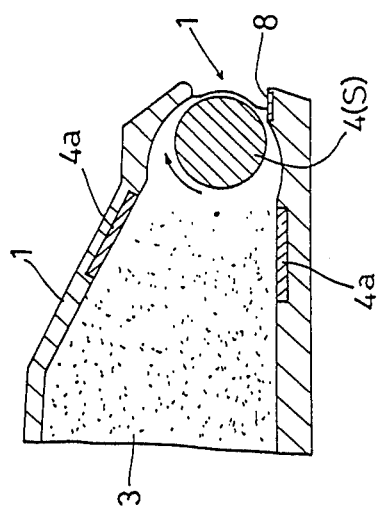

Further, as shown in FIG. 9B, the ejection drive means may include a conductive roller 4, an ac power source 12, and a dc power source 10. A non-uniform electric field is formed between the roller 4 and the electrodes 8 by applying alternating current to the roller 4 and direct current to the electrodes 8. A field curtain thereby produced is utilized for ejecting the ink. The power sources connected to the roller 4 and the electrodes 8 may be alternating power sources for forming a non-uniform electric field between the roller 4 and the electrodes 8. For example, the roller 4 may be grounded, with the electrode 8 applied with alternating current. This modification may also include an opposed electrode 2 as shown in FIG. 2, which promotes ink ejection and allows an increased freedom for selecting a recording paper position relative to the orifice.

(7) In the foregoing embodiment, the orifice 1a in slit form includes a plurality of electrodes 8 which receive image signals corresponding to the dots. Instead, a plurality of orifices 1a may be provided to correspond to the dots. In this case, the roller 4 acting as the feed means S may extend through all of the orifices 1a. Alternatively, the feed means S may comprise a plurality of plates 15 provided for the respective orifices 1a, each plate 15 being rotatable on an axis extending perpendicular to a direction in which the orifices 1a are arranged.

Figure 12:
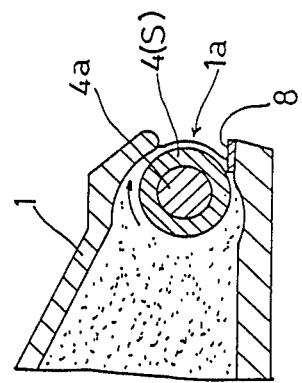
FIG. 12 is a sectional side view of a modified ink nozzle.

(8) In the foregoing embodiment, the plurality of electrodes 8 are embedded in the lower inside wall of the orifice 1a. As shown in FIG. 12, the electrodes 8 may be mounted on the lower inside wall of the orifice 1a by vapor deposition. Though not shown, the electrodes 8 may be mounted on the upper inside wall of the orifice 1a, instead. Further, the electrodes 8 may be disposed in the ink feed passage to effect a uniform and efficient heat energy transfer for ejecting the fused ink from the orifice 1a.

Figure 13:
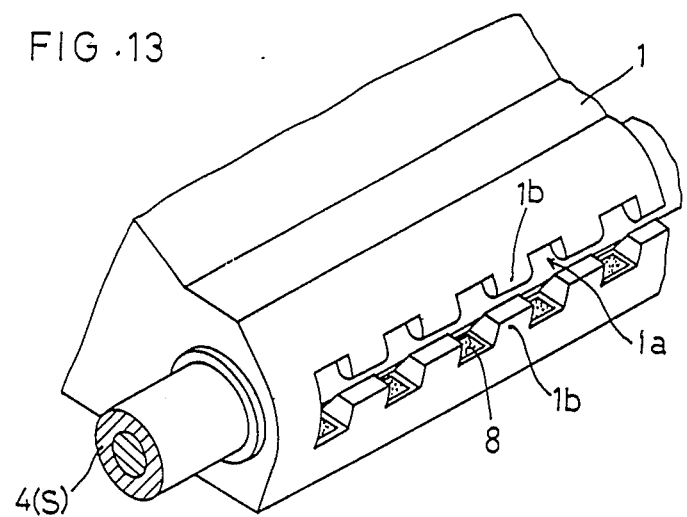
FIGS. 13 and 14 are perspective views of modified ink nozzles, respectively.
Figure 14:
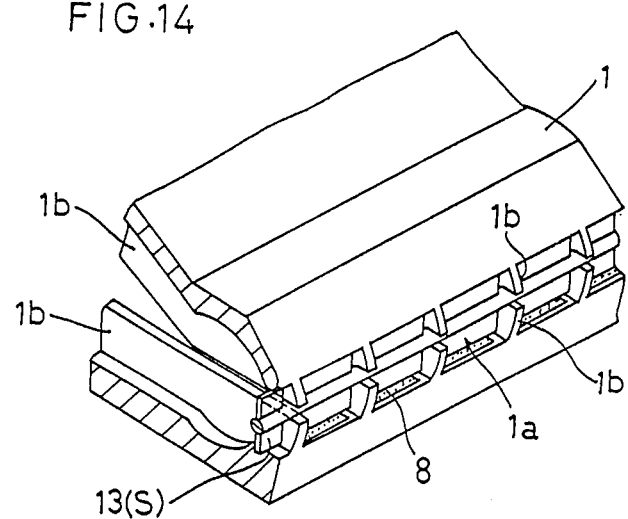

(9) Various modifications may be made to the specific construction of the ink nozzle 1 and its orifice 1a. To prevent sideways flows of the fused ink which would deteriorate image quality, the slit-like orifice 1a may include upper and lower guides 1b as shown in FIG. 13, or the nozzle 1 may define upper and lower guides 1b extending from the orifice 1a inwardly of the nozzle 1 as shown in FIG. 14. The other details shown in FIGS. 13 and 14 are the same as in the various constructions hereinbefore described, and such parts are labeled with like reference numerals without repeating their description.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An ink jet printer using thermally fusible ink for ejecting the ink in the form of drops, comprising:
    an ink nozzle defining a feed passage for feeding the thermally fusible ink and orifice means for ejecting the ink;
    ink feed means rotatably disposed adjacent to said orifice means for forcibly feeding the ink to said orifice means;
    heating means disposed in said feed passage upstream of the ink feed means for heating and fusing the ink before the ink is fed to the orifice means;
    ejecting means downstream of said ink feed means for ejecting the ink fused by said heating means to a recording medium through said orifice means by electrostatic force, said recording medium set at a distance from said orifice means; and
    ejection control means for operating said ejecting means in accordance with an image signal.

2. An ink jet printer as claimed in claim 1, wherein said heating means is disposed in said feed passage upstream of said feed means.

3. An ink jet printer as claimed in claim 1, wherein said heating means is disposed in an inside wall of said ink nozzle adjacent said feed means.

4. An ink jet printer as claimed in claim, wherein said heating means defines inside walls of said ink nozzle.

5. An ink jet printer as claimed in claim 1, wherein said orifice means is in slit form.

6. An ink jet printer as claimed in claim 6, wherein said orifice means in slit form defines guides having grooves arranged at fixed intervals.

7. An ink jet printer as claimed in claim 1, wherein said ink feed means comprises a roller means rotatable about an axis extending parallel to said orifice means.

8. An ink jet printer as claimed in claim 7, wherein said roller means defines a plurality of peripheral grooves arranged at fixed intervals axially of said roller means.

9. An ink jet printer as claimed in claim 7, wherein said roller means is surfacially treated into ink-affined parts and ink-repellent parts having a fixed width and extending peripherally of the roller means, said ink-affined parts and said ink-repellent parts being arranged alternately at fixed intervals axially of said roller means.

10. An ink jet printer as claimed in claim 7, wherein said roller means defines a plurality of axial grooves arranged at fixed intervals peripherally thereof.

11. An ink jet printer as claimed in claim 7, wherein said roller means comprises a stranded wire.

12. An ink jet printer as claimed in claim 1, wherein said ink feed means comprises a plate rotatable about an axis extending parallel to said orifice means, said plate having an axial width substantially corresponding to a width of said orifice means.

13. An ink jet printer as claimed in claim 1 and acting as a dot printer, wherein said ink nozzle defines a plurality of orifices corresponding in number to dots.

14. An ink jet printer as claimed in claim 13, wherein said ink feed mean comprises a plurality of plates each rotatable on an axis extending perpendicular to a direction in which said orifices are arranged.

15. An ink jet printer as claimed in claim 13, wherein said ink feed means comprises a roller extending through lateral walls of said orifices.

16. An ink jet printer as claimed in claim 1, wherein said ejecting means includes electrodes arranged in said ink nozzle adjacent to said orifice means, an opposed electrode disposed opposite said orifice means across said recording medium, and power sources connected respectively to said electrodes.

17. An ink jet printer as claimed in claim 1, wherein said ejection drive means includes at least one pair of electrodes disposed in said ink nozzle adjacent to said orifice means, and ann alternating power source connected between said electrodes for generating an electric field curtain force.

18. An ink jet printer as claimed in claim 17, wherein said pair of electrodes comprise an electrode disposed in said ink nozzle adjacent said orifice means, and a conductive roller.

19. An ink jet printer as claimed in claim 1, wherein said ink nozzle includes an agitating roller disposed in said feed passage upstream of said feed means.

20. An ink jet printer as claimed in claim 1, wherein said thermally fusible ink is a solid, powdery ink.

21. An ink jet printer as claimed in claim 1, wherein said thermally fusible ink has a fusing temperature of 60–160° C.

22. An ink jet printer as claimed in claim 1, wherein said thermally fusible ink, when fused, has a viscosity of 0.8–500 c.p.

23. An ink jet printer using thermally fusible ink for ejecting the ink in the form of drops, comprising:
an ink nozzle defining a feed passage for feeding the thermally fisible ink and orifice means in slit form for ejecting the ink;
roller means disposed adjacent to said orifice means for forcibly feeding the ink to said orifice mans, said roller means being rotatable about an axis extending parallel to said orifice means;
heating means disposed in said roller means for heating and fusing the ink before the ink is fed to the orifice means;
ejecting means downstream of said roller means for ejecting the ink fused by said heating means to a recording medium from said orifice means by electrostatic force, said recording medium set at a distance from the orifice means; and
ejection control means for operating said ejecting means in accordance with an image signal.

24. An ink jet printer as claimed in claim 12, wherein said orifice means in slit form defines guides having grooves arranged at fixed intervals.

25. An ink jet printer as claimed in claim 23, wherein said roller means defines a plurality of peripheral grooves arranged at fixed intervals along the axis of said roller means.

26. An ink jet printer as claimed in claim 23, wherein said roller means is surfacially treated into ink-affined parts and ink-repellent parts having a fixed width and extending peripherally of the roller, said ink-affined parts and said ink repellent parts being arranged alternately at fixed intervals axially of said roller means.

27. An ink jet printer as claimed in claim 23, wherein said roller means defines a plurality of axial grooves arranged at fixed intervals peripherally thereof.

28. An ink jet printer as claimed in claim 23, wherein said roller means comprises a stranded wire.

29. An ink jet printer as claimed in claim 23, wherein said ejecting means includes electrodes arranged in said ink nozzle adjacent to said orifice means, an opposed electrode disposed opposite said orifice means across recording medium, and power sources connected respectively to said electrodes.

30. An ink jet printer as claimed in claim 23, wherein said ejecting means includes at least one pair of electrodes disposed in said ink nozzle adjacent to said orifice means, and an alternating power source connected between said electrodes for generating an electric field curtain force.

31. An ink jet printer as claimed in claim 23, wherein said ink nozzle includes an agitating roller disposed in said feed passage upstream of said feed means.

32. An ink jet printer as claimed in claim 23, wherein said thermally fusible ink is a solid, powdery ink.

33. An ink jet printer as claimed in claim 23, wherein said thermally fusible in has a fusing temperature of 60–160° C.

34. An ink jet printer as claimed in claim 23, wherein said thermally fusible ink, when fused, has a viscosity of 0.8–500 c.p.

* * * * *